United States Patent
Wenglorz

(10) Patent No.: US 10,325,327 B2
(45) Date of Patent: Jun. 18, 2019

(54) METHOD AND APPARATUS FOR CUSTOM-ENGINEERED SOURCING AND MATCHING OFFERING PARTIES WITH SEEKING PARTIES WITH THE OFFERING PARTY BEING A JOB SEEKER, AN EMPLOYEE OR A LESSEE AND THE SEEKING PARTY BEING AN EMPLOYER OR A LANDLORD

(71) Applicant: Gerhard H. Wenglorz, Horb (DE)

(72) Inventor: Gerhard H. Wenglorz, Horb (DE)

( * ) Notice: Subject to any disclaimer, the term of this patent is extended or adjusted under 35 U.S.C. 154(b) by 998 days.

(21) Appl. No.: 14/691,891

(22) Filed: Apr. 21, 2015

(65) Prior Publication Data

US 2015/0228036 A1 Aug. 13, 2015

Related U.S. Application Data

(63) Continuation of application No. 14/102,778, filed on Dec. 11, 2013, now abandoned.

(51) Int. Cl.
*G06Q 50/00* (2012.01)
*G06F 16/951* (2019.01)
*G06N 7/00* (2006.01)
*G06Q 10/00* (2012.01)
*G06F 17/30* (2006.01)
*G06F 17/27* (2006.01)

(52) U.S. Cl.
CPC .......... *G06Q 50/01* (2013.01); *G06F 16/951* (2019.01); *G06N 7/00* (2013.01)

(58) Field of Classification Search
USPC .............. 705/7.14, 7.39, 7.42, 320, 321
See application file for complete search history.

(56) References Cited

U.S. PATENT DOCUMENTS

| 7,207,804 | B2 | 4/2007 | Hersh |
| 7,606,778 | B2 | 10/2009 | Dewar |
| 8,185,424 | B2 | 5/2012 | Hansen |
| 2006/0235884 | A1* | 10/2006 | Pfenninger ............ G06Q 10/10 |
| 2011/0313963 | A1 | 12/2011 | Liu et al. |

(Continued)

OTHER PUBLICATIONS

Collins, James Charles "Good to Great: Why Some Companies Make the Leap . . . , and Others Don't" Harper Business; 1 st ed.; Oct. 16, 2001; ISBN 0-06-662099, pp. 44-45.*

(Continued)

*Primary Examiner* — Mark A Fleischer
(74) *Attorney, Agent, or Firm* — Jason H. Vick; Sheridan Ross, PC

(57) ABSTRACT

The present invention relates, according to one aspect, to a method for creating a group comprising at least one of a plurality of first parties and a plurality of second parties, the method comprising the steps of a first party preparing a first data set, a second party preparing a second data set, determining a correspondence indicator indicating a degree of correspondence between the first data set and the second data set, and storing said correspondence indicator and an identifying indicator for at least one of said first party and said second party linked to each other, wherein said first type of data includes objective information, and wherein said second type of data includes subjective information.

8 Claims, 9 Drawing Sheets

(56) References Cited

U.S. PATENT DOCUMENTS

2013/0198098 A1* 8/2013 Schneiderman ..... G06Q 10/105
 705/320

OTHER PUBLICATIONS

Gardner, Nora, et al. "Question for HR Chief: Are We Using Our 'People Data' to Create Value?" McKinsey Quarterly, Mar. 2011.*
Schmidt, Frank L. et al. "The Validity and Utility of Selection Methods in Personnel Psychology:Practical and Theoretical Implications of 85 Years of Research Findings" Psychological Bulletin1998, vol. 124, No. 2, The American Psychological Association, Inc. 1998, pp. 262-274.*
U.S. Appl. No. 14/102,778, filed Dec. 11, 2013, Wenglorz.
Mcilvaine, Heather "Find the Perfect Job: Match-Making Software for HR" SAP.info, Dec. 12, 2012.
Official Action for U.S. Appl. No. 14/102,778, dated Feb. 20, 2014.
Official Action for U.S. Appl. No. 14/102,778, dated Jul. 14, 2014.
Official Action for U.S. Appl. No. 14/102,778, dated Feb. 2, 2015.

* cited by examiner

| | |
|---|---|
| Speed: | 90 |
| Quality | 80 |
| Error correcting: | 60 |
| Forethought: | 85 |
| Persistence: | 75 |

Result for
R&D engineer

| ID | Score |
|---|---|
| Chris Williams | 88 |
| Mary Stevens | 85 |
| Ted Davis | 84 |
| Ann Moore | 83 |
| Jim Brown | 77 |

Fig. 12

Result for
Ted David

| ID | Score |
|---|---|
| ABC Enterprises | 93 |
| Warehouses Ltd. | 86 |
| Top Computing | 72 |
| XYZ Incorporated | 68 |

Fig. 14

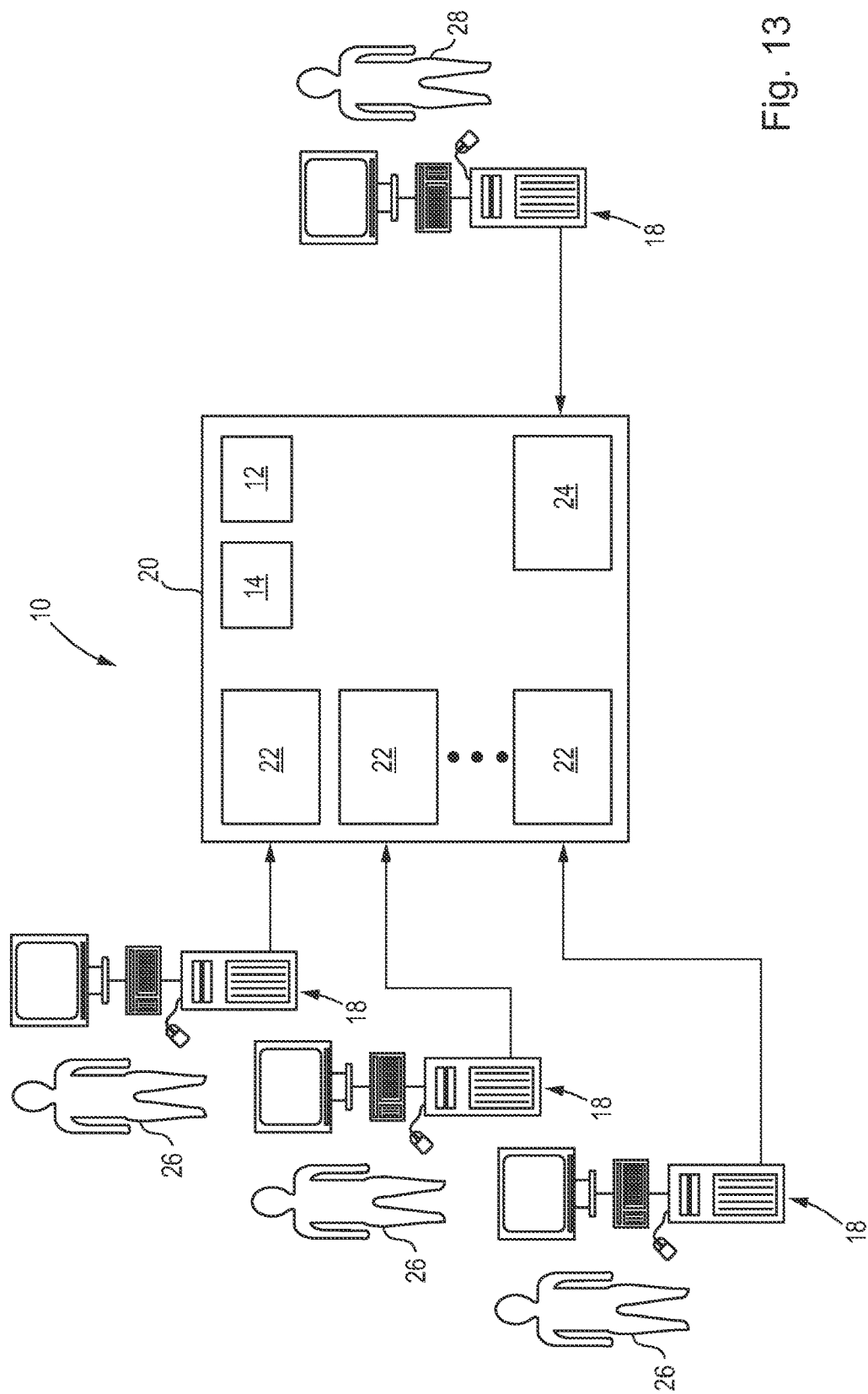

METHOD AND APPARATUS FOR CUSTOM-ENGINEERED SOURCING AND MATCHING OFFERING PARTIES WITH SEEKING PARTIES WITH THE OFFERING PARTY BEING A JOB SEEKER, AN EMPLOYEE OR A LESSEE AND THE SEEKING PARTY BEING AN EMPLOYER OR A LANDLORD

CROSS-REFERENCE TO RELATED APPLICATIONS

This application is a Continuation of U.S. patent application Ser. No. 14/102,778, filed Dec. 11, 2013, the disclosure of which is fully incorporated herein by reference in its entirety.

BACKGROUND

The present invention relates to methods for matching at least one first party having certain requirements and at least one second party having certain capabilities and skills more particularly, the present invention relates to matching the first and second parties based on hard facts and soft skills, wherein said soft skills are obtained by an interactive test.

There is a great need for matching people. In particular, there is a need to match people seeking people according to certain requirements with people who are offering certain skills and capabilities. The need for matching people may arise in a great number of different situations. While an obvious example may be to match employers and employees, matching needs may also occur for people desiring to travel together, people seeking room mates, landlords looking for a lessee, and other situations.

There are well-established means to match people based on objective, i.e. factual, information. In the context of the present application the term "objective information" is to be understood in particular as personal information which can be objectively assessed or objectively determined without depending on a temporary or situational behavior of the person. This objective information may be determined without the need to interact with this person or to have the person perform a certain mental task, e.g. an intellectual task, a situational task, a social task, a behavioral task, etc. Examples for such objective information are years of experience in a certain field, possession of a driver's license, highest educational degree, age, gender, etc. This kind of objective information is often referred to as "hard facts", sometimes also as "hard skills".

However, despite the great number of methods available to perform a matching based on objective information, the actual, "real-life" success of such matching is surprisingly low. For a significant number of cases, a match is found to be inadequate, even though the matching algorithm has suggested a very good match.

One of the reasons for this discrepancy is believed to be that hard facts do not provide a reliable basis for predicting whether a person will actually be a good match with respect to another person or whether that person will have a good fit for a certain situation. Rather, it has been determined that it is also important to assess the subjective information about a person in order to more accurately predict the match. This subjective information is the complement to the objective information and can be assessed by interacting with the person and/or have the person perform a mental task. Examples for such subjective information is speed, forethought, persistence, ability to correct errors, ability to avoid errors, level of empathy, etc. This subjective information is often called "soft skills", sometimes also "soft facts".

One notable book in this context is by James Charles Collins, "Good to great: why some companies make the leap . . . and others don't", ISBN 0-06-662099, see pages 44-45, which are incorporated herein by reference in their entirety. This book makes clear that the main point in having success is "to first get the right people on the bus (and the wrong people of the bus)".

However, determining this subjective personal information requires a lot of time and organizational efforts. Potential candidates have to be invited, time for conversations and discussions has to be allocated, and an internal review and assessment has to follow. There are tests available that assist in performing such subjective information, see, e.g., Schmidt, Frank L., Hunter, John E.: The Validity and Utility of Selection Methods in Personnel Psychology, Practical and Theoretical Implications of 85 Years of Research Findings, Psychological Bulletin, September 1998 Vol. 124, No. 2, 262-274, the contents of this document and the documents referred to in this document fully incorporated herein by reference. However, these tests still require a significant amount of time for planning, performing and assessing such tests.

The McKinsey Quarterly of March 2011 contains an article by Nora Gardner, Devin McGranahan, and William Wolf, "Question for your HR chief: Are we using our 'people data' to create value?", the article incorporated herein by reference in its entirety, addresses challenges in the context of analyzing human resources.

Therefore, there is a need in the art for a more effective determination of matches.

SUMMARY

In accordance with one exemplary embodiment, a method and computing system is provided that require less time by the seeking party to identify matches. It is a further aspect to provide a method and computing system that offers a closer correlation of an expected match and an actual ("real-life") match. It is yet a further aspect to provide a method and computing system that allows to determine matches between a large number of first parties and a large number of second parties. It is still a further aspect to provide a method and computing system which allows to take into account one or more past decisions when identifying matches. It is noted that the expressions "to match," "match," "matching," etc. are not limited to a perfect match, but also comprise partial matches and also the situation of "no match."

According to a first aspect, there is provided a computer-implemented method for creating an offering parties group, the method comprising the steps of:

a seeking party preparing, via a seeking party user interface on a computer, a target data set, including by the seeking party, creating a target reference information item for identifying said target data set, by the seeking party, adding target data of a first type of data to said target data set, said target data comprising a target data item, by the seeking party, adding further target data of a second type of data to said target data set, said further target data comprising a further target data item, storing, in storage, said target data set, for each offering party of a plurality of offering parties, said offering party preparing, via an offering party user interface on a computer, an offering data set, including by the offering party, creating an offering reference information item for identifying said offering data set,
by the offering party, adding offering data of said first type of data to said second data set, said offering data comprising a offering data item,
by the offering party, performing an interactive test requiring working on mental tasks,
automatically evaluating results of said interactive test for deriving further offering data of said second type of data, said further offering data comprising a further offering data item,
adding said further offering data to said second data set,
storing, in storage, said offering data set,
for each offering party of said plurality of offering parties, determining, using at least one processor and memory, a correspondence indicator indicating a degree of correspondence between the target data set and each of the offering data sets of each offering party, and
for each offering party of said plurality of offering parties, storing said correspondence indicator of said offering party and an identifying indicator for said offering party linked to each other,
wherein said first type of data includes objective personal information, and
wherein said second type of data includes subjective personal information.

According to a second aspect, there is provided a computer-implemented method for creating a seeking parties group, the method comprising the steps of:
for each seeking party of a plurality a seeking parties, preparing, via a user interface on a computer, a target data set, including
by the seeking party, creating a target reference information item for identifying said target data set,
by the seeking party, adding target data of a first type of data to said target data set, said target data comprising a target data item,
by the seeking party, adding further target data of a second type of data to said target data set, said further target data comprising a further target data item,
storing, in storage, said target data set,
an offering party preparing, via a user interface on a computer, an offering data set, including
by the offering party, creating an offering reference information item for identifying said offering data set,
by the offering party, adding offering data of said first type of data to said second data set, said offering data comprising a offering data item,
by the offering party, performing an interactive test requiring working on mental tasks,
automatically evaluating results of said interactive test for deriving further offering data of said second type of data, said further offering data comprising a further offering data item,
adding said further offering data to said second data set,
storing said offering data set,
for each seeking party of said plurality of seeking parties, determining, using at least one processor and memory, a correspondence indicator indicating a degree of correspondence between the target data set of each seeking party and the offering data set, and
for each seeking party of said plurality of seeking parties, storing said correspondence indicator of said seeking party and an identifying indicator for said seeking party linked to each other,
wherein said first type of data includes objective information, and
wherein said second type of data includes subjective information.

According to a third aspect there is provided a computer-implemented method for creating a group comprising at least one of a plurality of first parties and a plurality of second parties, the method comprising the steps of:
a first party preparing, via a user interface on a computer, a first data set, including
creating a first reference information item for identifying said first data set,
adding first data of a first type of data to said first data set,
adding further first data of a second type of data to said first data set,
a second party preparing, via a user interface on a computer, a second data set, including
creating a second reference information item for identifying said second data set,
adding second data of said first type of data to said second data set,
performing an interactive test requiring working on mental tasks,
automatically evaluating results of said interactive test for deriving further second data of said second type of data,
adding said further second data to said second data set,
determining, using at least one processor and memory, a correspondence indicator indicating a degree of correspondence between the first data set and the second data set, and
storing said correspondence indicator and an identifying indicator for at least one of said first party and said second party linked to each other,
wherein said first type of data includes objective information, and
wherein said second type of data includes subjective information.

According to a fourth aspect there is provided a computing system including a non-transitory computer-readable medium storing instructions for at least one processor, the instructions, when executed, causing the at least one processor to perform said steps of the method according to at least one of the first, second and third aspects.

These and other implementations and embodiments are shown in the drawings and described in more details below. Other features and advantages will be apparent from the following description, the drawings and the claims.

BRIEF DESCRIPTION OF THE DRAWINGS

FIG. 12 shows an exemplary representation of an offering parties group.

FIG. 13 shows another exemplary embodiment where a plurality of seeking parties is matched with an offering party.

FIG. 14 shows an exemplary representation of a seeking parties group.

DESCRIPTION OF EXEMPLARY EMBODIMENTS

Figure 1:
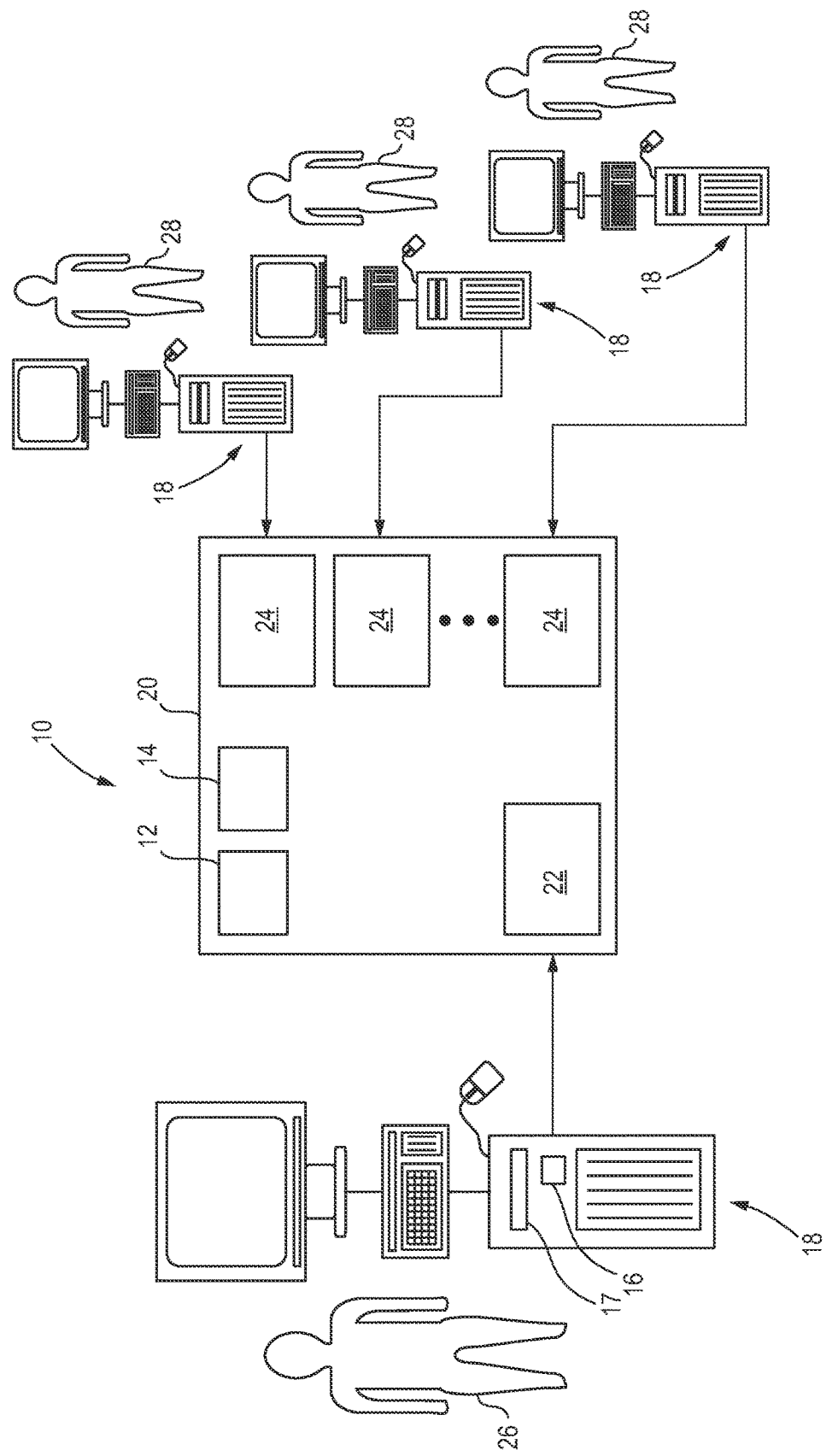
FIG. 1 shows exemplary embodiment where a plurality of offering parties is matched with a seeking party.

FIG. 1 shows an embodiment of a computing system 10 including a computer-readable medium 12 storing instructions, one or more physical processors 14, 16 and a storage medium drive 17, such as an optical, opto-magnet, solid-state, or hard drive. Such computing system will allow to execute the methods according to some aspects of the present invention.

The shown exemplary computing system 10 comprises a plurality of client computer devices 18 that are connected to a server computing device 20. The connections can be achieved via cable connections and/or wireless connections as known in the art, e.g. LAN, WLAN, 3G, LTE, etc. While the exemplary client computer devices are shown as personal computers, any device capable of displaying information and receiving user input is suitable, including, but not limited to, laptops, notebooks, tablets, PDA, cellular phones, smartphones, thin clients, fat clients, etc. Client computing devices 18 can be an individual device of one user or may be shared by multiple users.

In the shown embodiment, the server computing device 20 has a first data set, here a target data set 22, and a plurality of second data sets, here offering data sets 24 which differ from another.

In the shown embodiment, the client computing device 18 at the left-hand side is accessed by a first party, here a seeking party 26. The client computing devices 18 at the right hand side are accessed by second parties, here offering parties 28.

While the computing system 10 is shown to have multiple client computing devices 18 accessed by offering parties 28, according to some embodiments, one client computing device 18 accessed by one or more offering parties is provided. According to further embodiments, the computing system 10 has a client computing device 18 which is accessed by at least one seeking party and at least one offering party. In other embodiments, the client computing devices 18 may be connected directly to one another, and the functionality of the server computing device 20 is integrated into one or more of the client computing devices 18. Also according to other embodiments, all functions are implemented in one client computing device 18 which is accessed by at least one seeking party and at least one offering party.

Figure 2:
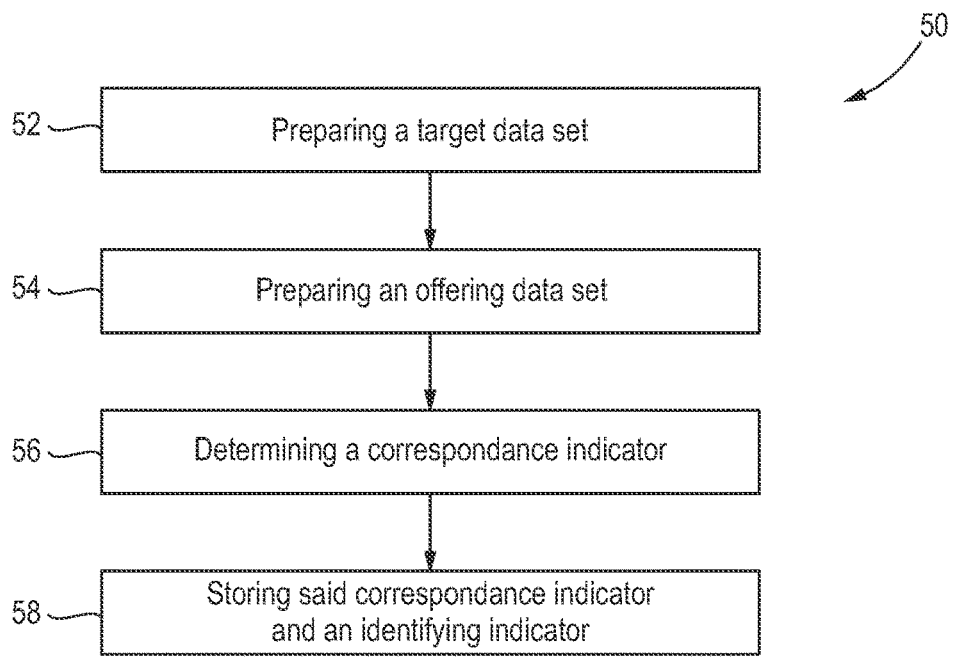
FIG. 2 shows an exemplary embodiment of steps for creating a group comprising at least one of a plurality of first parties and a plurality of second parties.

FIG. 2 shows a method 50 for creating a group comprising at least one of a plurality of first parties and a plurality of second parties, here at least one seeking party and at least one offering party, according to one aspect of the invention.

In step 52, a first party prepares, via an interface on the computer, a first data set, here a seeking party 26 prepares a first data set 22. In another step 54, a second party prepares a second data set, here an offering party 28 prepares an offering data set 24. In step 56, a correspondence indicator between the target data set and the offering data set is determined by at least one processor. The correspondence indicator indicates a degree of correspondence between the target data set and the offering data set.

Then, in step 58, said correspondence indicator and an indicator identifying at least one of the seeking party and the offering party are stored in storage. The correspondence indicator and the identifying indicator are stored such that they are linked to each other. This means that the correspondence indicator is linked to said seeking party and/or said offering party. As a result, stored information is available as to how well a second data set/an offering data set matches a first data set/target data set or, more particularly, how well a second party/offering party matches a first party/seeking party. In some embodiments the identifying indicator may be the first reference information item or the target reference information item.

The stored information may be stored in a group, so that more than one second party/offering party can be linked with its correspondence indicator to a first party, or that more than one first party/seeking party can be linked to a second party/offering party, or that more than one first party/seeking party can be linked to more than one second party/offering party. This will be discussed in more detail further down.

Figure 3:
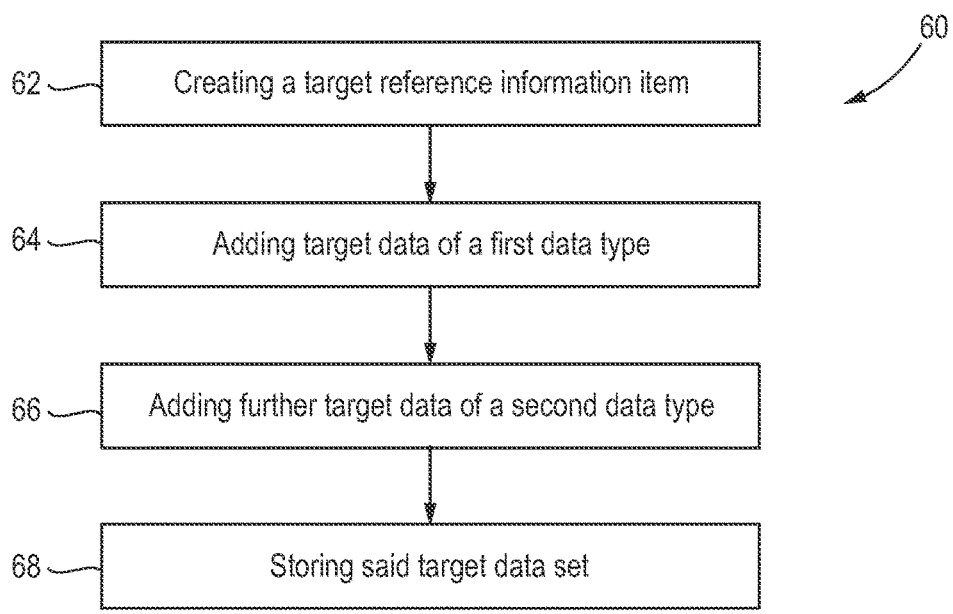
FIG. 3 shows an exemplary embodiment of steps for preparing a first data set or a target data set.

FIG. 3 shows how a first data set or a target data set may be prepared. There is shown an embodiment of a method 60 for preparing a target data set 22. In step 62, a target reference information item is created. This target reference information item may be used to identify and/or reference to the target data set.

In a further step 64, target data of a first data type is added to the target data set 22. Therefore, the target data relates to objective information or objective personal information. In step 66, further target data of a second data type is added to the target data set 22. Thus, the further target data relates to subjective information or subjective personal information. In step 68, the target data set 22 is stored in storage. In certain embodiments the target reference information item will be used as the identifying indicator when storing the correspondence indicator.

In an exemplary embodiment, the subjective information may relate to one or more of the following: speed, quality, forethought, error correcting, error avoidance, persistence, flexibility, speed of learning, prudence and conscientiousness.

The target data set does not have to be prepared in full at one time. Rather, it is possible to provide only some data to the target data set and then add/modify/delete data at a later time. Also, a target data set may lack some target data or further target data, and a correspondence indicator may still be determined.

Figure 4:
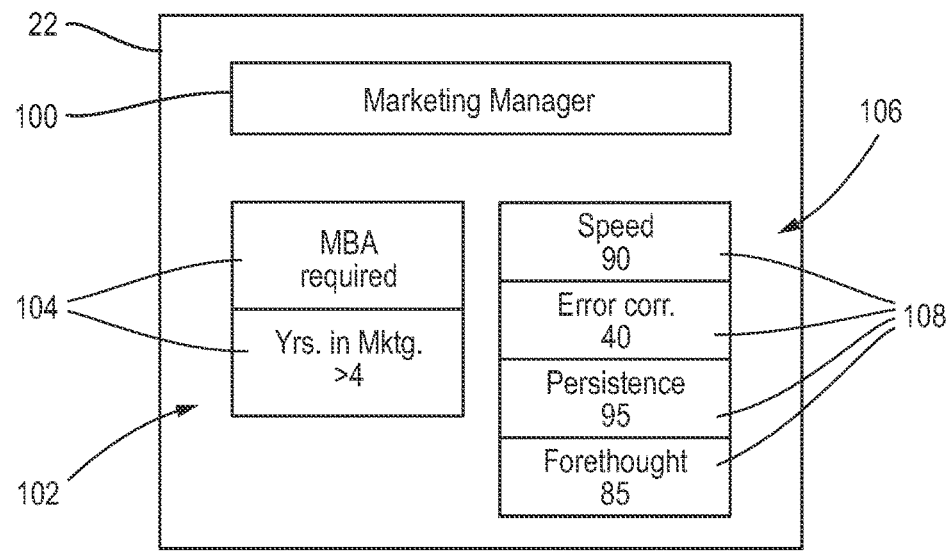
FIG. 4 shows a first exemplary embodiment of a target data set.

FIG. 4 shows an exemplary target data set 22. The target reference information item 100 holds the job title "marketing manager". It is pointed out that the target reference information item 100 may also be a number, e.g. an identification number, or a text comprising any characters.

The target data set 22 comprises target data 102 of a first type of data. The target data 102 comprises two target data items 104. The target data set 22 comprises further target data 106 comprising two further target data items 108.

For this exemplary target data set 22, comprises a desired profile for a marketing manager which contains the requirements of an MBA degree and more than four years of experience in marketing as objective information. Further, regarding the subjective information, a value in speed of at least 90, a value of error correcting of at least 40, a value persistence of at least 95, and a value of forethought of at least 85 is desired. Other subjective information may be available for defining a desired profile, but may have been set as not relevant by the seeking party, e.g. by setting the corresponding value to a minimum, e.g. 0. Such non relevant information is not shown here.

The values provided in the subjective information are, in this exemplary embodiment, in a range between 0 and 100. They are intended to describe how important a certain subjective information is. The closer the desired value is to a minimum value of that subjective information, the less importance is assigned to this subjective information. The closer the desired value is to maximum value of that subjective information, the more importance is assigned to this information. There is no limitation in how to define these values and how to set the minimum value and maximum value for each subjective information. This can be values as well as letters, e.g. as in a grading system for A to F. Also, it may be an inversed system where a lower number indicates a better performance.

The content and meaning of the target data items 104 and further target data items 108 may depend on what a seeking party believes to be important for a target data set, e.g. for a certain job offering. The further target data items 108 expressing subjective information may further depend on the type of interactive test that is chosen, as will be explained further down.

Figure 5:
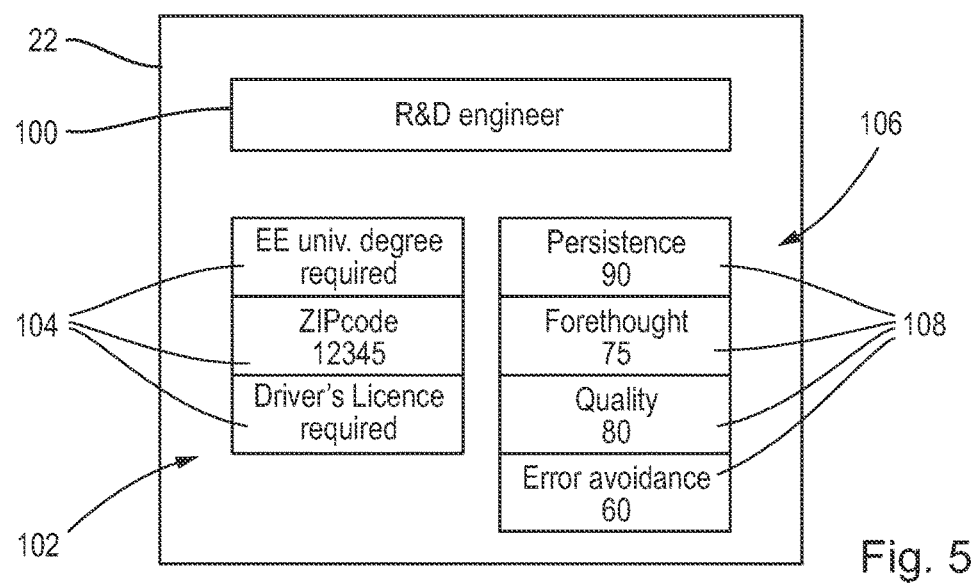
FIG. 5 shows a second exemplary embodiment of a target data set.

FIG. 5 shows another exemplary embodiment for a target data set 22. The target reference information item 100 indicates that this target data set 22 relates to the position of an R&D engineer. The target data items 104 indicate that a degree in electro-engineering from a university is required, that the offering is related to ZIP-code 12345, and that a drivers license is required. The further target data items 108 indicate that a value of persistence of at least 90, a value of forethought of at least 75, a value of quality of at least 80, and a value of error avoidance of 60 are desired. Again, other subjective information may be available for defining a desired profile, but may have been set as not relevant by the seeking party, e.g. by setting the corresponding value to a minimum, e.g. 0. Such non relevant information is not shown here.

Figure 6:
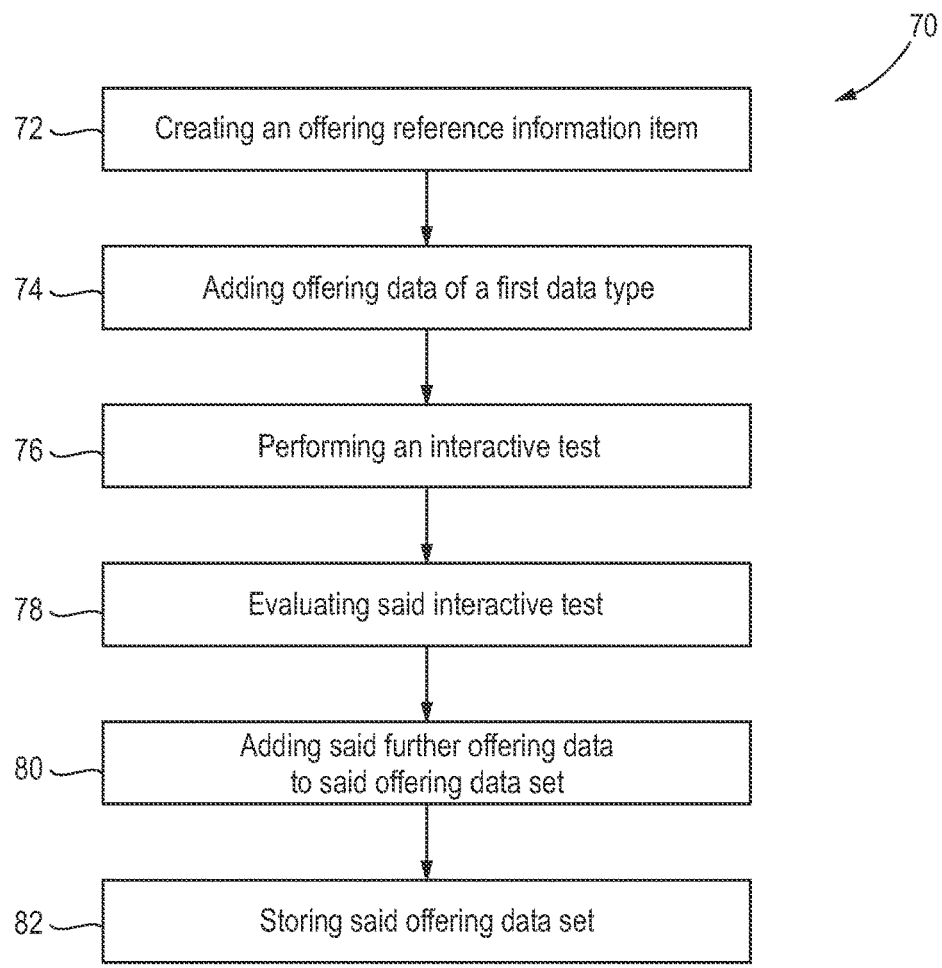
FIG. 6 shows an exemplary embodiment of steps for preparing a second data set or an offering data set.

FIG. 6 shows an exemplary embodiment of a method for preparing a second data set/offering data set. The method 70 comprises step 72, where a second reference information item/offering reference information item is created. The offering data set does not have to be prepared in full at one time. Rather, it is possible to provide only some data to the offering data set and then add/modify/delete data at a later time. Also, an offering data set may lack some offering data or further offering data, and a correspondence indicator may still be determined.

In step 74, second data/offering data of a first data type is added to the offering data set 24. In step 76, an interactive test is performed by the second party/offering party preparing the offering data set 24. The interactive test is designed to obtain subjective information which is not objectively available and requires interaction, at least intellectual interaction, of that second party/offering party. Such interactive test is preferably at least one of language-independent and culture-independent.

Figure 7:
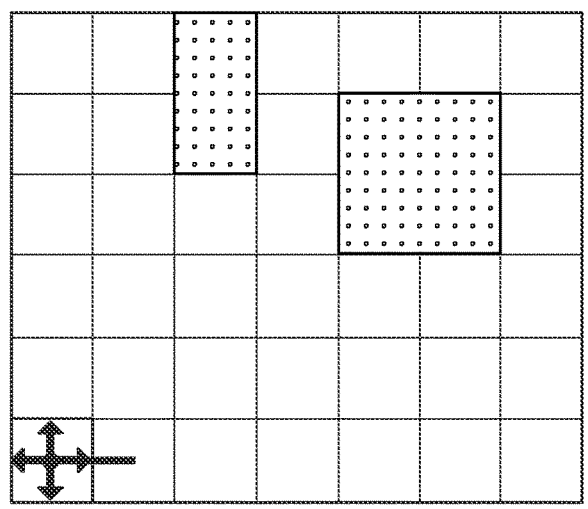
FIG. 7 shows an exemplary start situation of a part of an exemplary interactive test.

The interactive test can be chosen from a great variety of tests, see in particular the GMA tests (general mental ability tests) referred to by Schmidt and Hunter. An exemplary embodiment of such interactive test is the "GPS test" which will now be explained with reference to FIGS. 7 and 8. At least one of the tasks is shown in FIG. 7. It is the task to connect all squares with a continuous line without entering a square twice and without entering any of the dotted fields. One solution to this task is shown in FIG. 8.

The interactive test gathers a great amount of data while a user performs this task. For example, it is determined how quickly the user starts to move, how constant his moving is, whether there is a great amount of changes in direction, whether the user completes the task, whether the user misses squares or enters squares twice, how long the user pauses in between, how often the user has to correct moves, how much time is needed for corrections, how much time is needed for completion, etc.

Figures 8, 9:
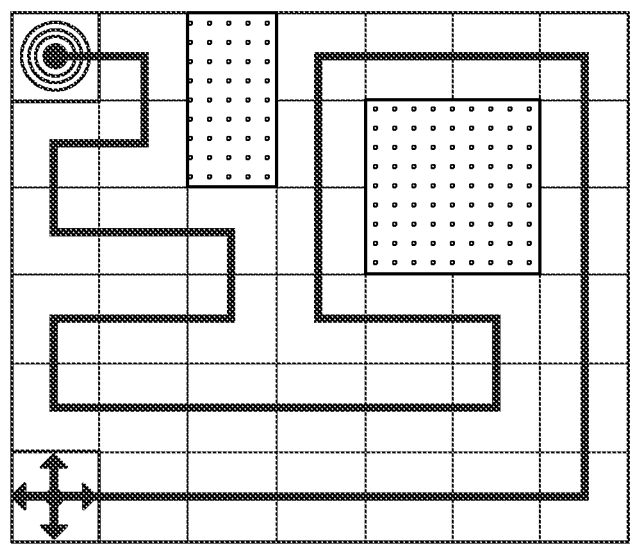
FIG. 8 shows an exemplary end situation of a part of an exemplary interactive test.
FIG. 9 shows exemplary further offering data items derived by evaluating an interactive test.

The test preferably comprises several tasks similar to the task shown in FIG. 8. This allows further to determine whether the user improves his strategy, reduces the number of errors, increases the speed of completion, is willing to persist through the number of tasks, etc.

Performing this interactive test, provides subjective information with regard to a number of further second data items/further offering data items. An exemplary embodiment of such result is shown in FIG. 9. The second party/offering party who has completed the task has obtained a value of speed of 90, a value of quality of 80, a value of error correcting of 60, a value of forethought of 85, and a value of persistence of 75.

In comparison to the further target data items that were provided/entered by the seeking party, the offering party does not provide/enter the further offering data items directly. Rather, now returning to FIG. 6, these further offering data items are derived in step 78 where the interactive test is evaluated. The evaluation is preferably performed using a computing device. As indicated before, the result of such evaluation is shown in the exemplary embodiment of FIG. 9.

In step 80, the further second data/further offering data, as obtained in step 78, is added to the second data set/offering data set. Then, in step 82, the second data set/offering data set is stored. In some embodiments the identifying indicator may be the second reference information item or the offering reference information item.

Figure 10:
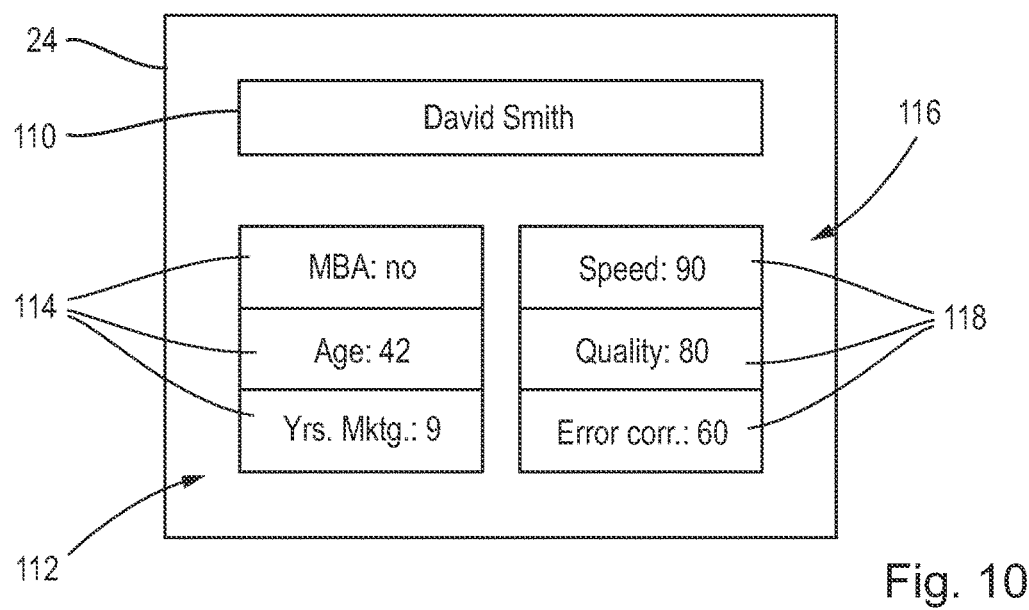
FIG. 10 shows a first exemplary embodiment of an offering data set.

FIG. 10 shows an exemplary embodiment of a second data set or offering data set 24. The offering data set 24 comprises a second reference information/offering reference information 110 which comprises the value "David Smith". The offering data set 24 further comprises offering data 112 of a first type of data. The offering data 114 comprises three offering data items 114. The offering data set 24 also comprises further offering data 116 of a second type of data. The further offering set 116 comprises three further offering data items 118. The number of items in the offering data as well as in the further offering data is variable.

The objective information contained in the offering data 112 indicates that the offering party 28 does not have an MBA degree, is 42 years of age and has nine years of experience in marketing. The results that have been derived from the offering party 28 performing the interactive test are a value of speed of 90, a value of quality of 80 and a value of error correcting of 60.

The values provided in the subjective information are, in this exemplary embodiment, in a range between 0 and 100. They are intended to describe how well a certain subjective information or offering data item is met. The closer the desired value is to a minimum value of that subjective information, the less performance was shown with regard to this aspect. The closer the desired value is to maximum value of that subjective information, the better the performance that was shown with regard to this aspect. There is no limitation in how to define these values and how to set the minimum value and maximum value for each subjective information. This can be values as well as letters, e.g. as in a grading system for A to F. Also, it may be an inversed system where a lower number indicates a better performance.

Figure 11:
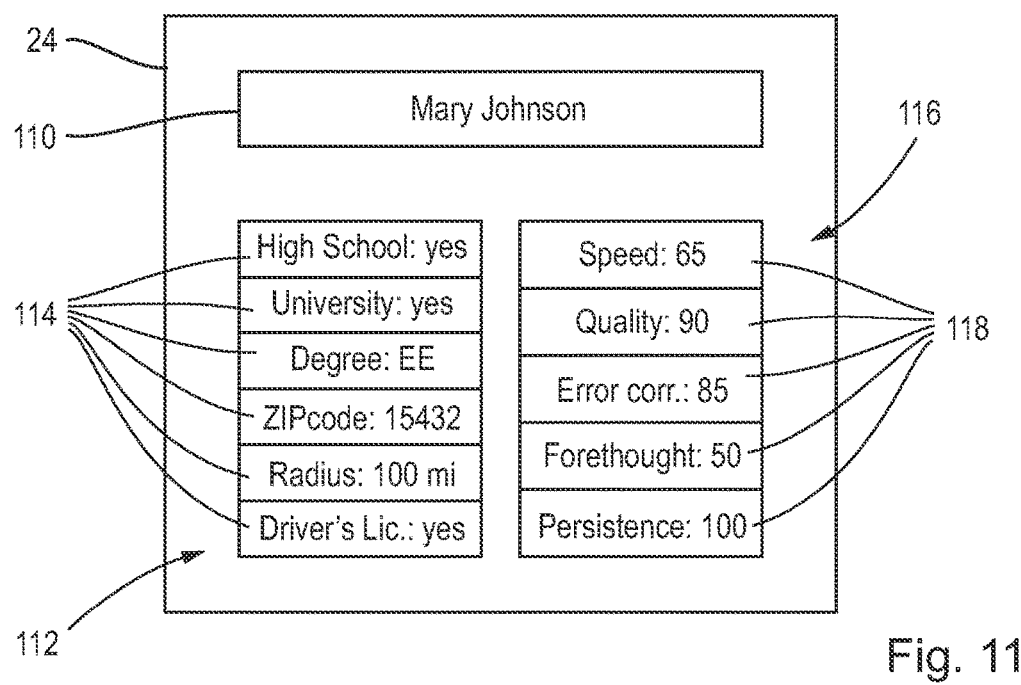
FIG. 11 shows a second exemplary embodiment of an offering data set.

FIG. 11 shows another exemplary embodiment of an offering data set 24. The offering data set 24 comprises a second reference information/offering reference information 110 which comprises the value "Mary Johnson". The objective information contained in the offering data 112 indicates that the offering party 28 has a high school degree and a university degree in electrical engineering, that a match is sought within 100 miles around the area of ZIP-code 15432, and that a driver's license is held. does not have an MBA degree, is 42 years of age and has nine years of experience in marketing. The results that have been derived from the offering party 28 performing the interactive test are a value of speed of 65, a value of quality of 90, a value of error correcting of 85, a value of forethought of 100, and a value of persistence of 100.

In the following, based on the exemplary embodiments shown in FIGS. 4 and 10, it is explained how a correspondence indicator may be determined. It is emphasized that the following is only one of a great variety of ways to determine a correspondence indicator. While the correspondence indicator allows to distinguish whether one match between a first party and a second party or a seeking party and an offering party is better than another match, it is not important how the correspondence indicator is determined.

In the exemplary embodiment, the match between the target data set "marketing manager" and the offering data set "David Smith" is performed automatically by one or more processors as follows.

Regarding the objective information, the offering party has no MBA, so that 0 points are given with regard to this target data item. The offering party has more than four years experience in marketing, so that the maximum number of points is awarded, here 100 points. Therefore, the offering party achieves a score of 100−(0+100)/2=50. This assumes an equal weighting of the individual target data items. In some embodiments, weighting will be applied to one or more target data items in order to highlight more or less important target data items.

Regarding the subjective information, the offering party exceeds the requirements of speed. For this exemplary embodiment, if an offering data item exceeds the corresponding target data item, a deviation of 0 is assigned. In other embodiments, a negative value will be assigned in this situation, since the difference between the target data item and the offering data item would be negative. Again, for this exemplary embodiment, the offering party misses the goal with regard to error correcting, so that a deviation of 10 is assigned. The resulting score is calculated as 100−(0+10):2=95.

Under the assumption that the seeking party has decided to apply a ratio of weights of the objective information and the subjective information as 1:1, the total correspondence indicator is calculated as (50+95):2=72.5.

However, in exemplary embodiments, the subjective information receives a greater weight than the objective information, e.g. 3:1. Then, the correspondence indicator would be calculated as (1×50+3×95):4=83.75.

The process described before can be performed for a plurality of offering parties where each offering party is assigned a correspondence indicator in view of a first data set of a first party or a target data set of a seeking party. In an exemplary embodiment, an example of such embodiment shown in FIG. 12, the offering parties group in which the results for the offering parties have been stored, is presented as a list of identifying indicators, here called "ID", with the corresponding correspondence indicator, here called "Score", in a descending order based on the correspondence indicators. This allows for an easy review of the results obtained by the method according to one aspect of the invention. The identifying indicator may comprise one or more items and may also be anonymized, e.g. by showing a reference number.

FIG. 13 shows another exemplary embodiment, where a plurality of seeking parties 26 and one offering party 28 is shown. The explanations regarding the computing system 10 and the various options how it may be implemented apply as in FIG. 1. Also, all the previous explanations with regard to the previous figures and embodiments apply.

One difference of the embodiment shown in FIG. 13 over the embodiment of FIG. 1 is that instead of one seeking party 26 a plurality of seeking party 26 is shown, while only one offering party 28 is shown instead of a plurality of offering parties 28.

Each seeking party 26 has prepared a target data set 22. The offering party 28 has prepared an offering data set 24. For each seeking party 26 of the plurality of seeking party 26 a correspondence indicator between the target data set 22 of that seeking party and the offering data set 24 is determined and stored in storage along with identifying indicators for the seeking party 26 in a seeking party's group. This allows the offering party 28 to identify seeking parties 26 that have a good match with regard to the offering data set 24.

An exemplary result of such process is shown in FIG. 14. The explanations made in the context of FIG. 12 apply correspondingly.

Figure 15:
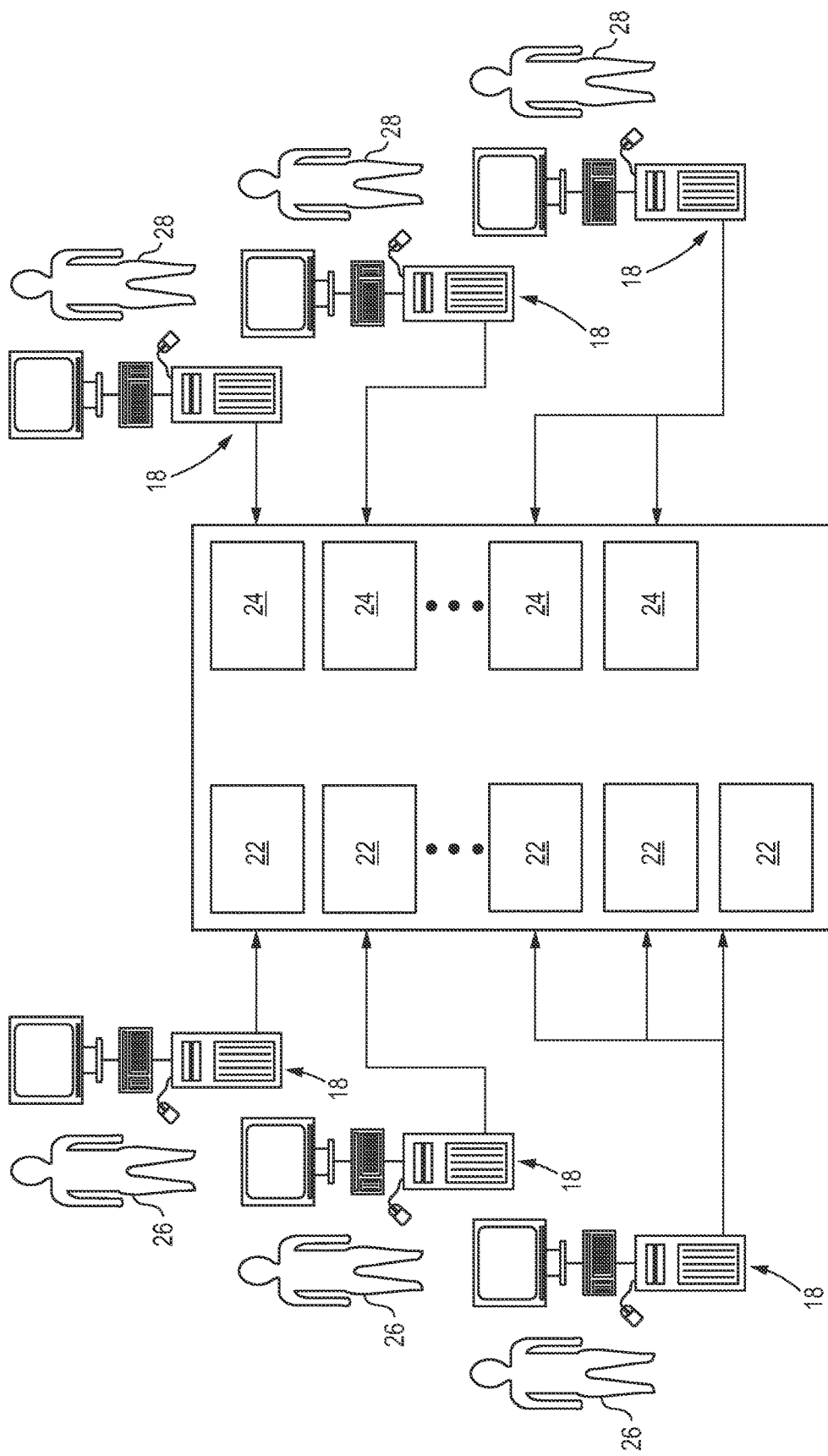
FIG. 15 shows a further exemplary embodiment where a computing system is accessed by a plurality of seeking parties and a plurality of offering parties in order to determine matches between seeking parties and offering parties.

FIG. 15 shows another exemplary embodiment, where a plurality of seeking parties 26 and a plurality of offering parties 28 is shown. As is shown in FIG. 15, a seeking party 26 may prepare more than one first data set or target data set, and an offering party 28 may prepare more than one second data set or offering data set. This is also possible for other embodiments, including the embodiments shown in FIGS. 1 and 13.

In some exemplary embodiments, the lists shown in FIGS. 12 and 14 have selectable entries. When clicking on an entry, e.g. on "Mary Stevens", a further functionality may be triggered. For example, more information may be displayed with regard to that entry, the entry is bookmarked, the entry is copied to a "preferred list", or a contact with the seeking party or offering party can be established, etc.

In the following, a exemplary embodiment will be explained which may provide for further advantages when taking into account a selected entry for the further processing.

For the following example it will be assumed that a seeking party has set a desired value of speed to 80 and a desired value of quality to 80. Further, the seeking party had indicated an interest in an exemplary offering party having a value of speed of 60 and a value of quality of 70.

While the selected exemplary offering party did not meet the desired values, clicking on the entry of the exemplary offering party indicates that there is an interest in this offering party even if the desired values are not achieved. It will now be explained how this information may be taken into account for the further processing.

Therefore, a further exemplary offering party is assumed, having a value of speed of 90 and a value of quality of 60. According to what has been explained before, the correspondence indicator would be calculated as follows. Since the further exemplary offering party exceeds the value of speed, this deviation is set to 0. With regard to quality, the further exemplary offering party has deviation of 80−60=20. Therefore, the correspondence indicator is calculated as 100−(0+20):2=100−10=90.

Now, in comparison, the exemplary offering party having a value of speed of 60 and a value of quality of 70 will be taken into account. First, the absolute differences between the exemplary offering party and the further exemplary offering party are calculated as abs(90−60)+abs(60−70)=30+10=40. In an exemplary embodiment, a scaling factor is calculated as the sum of the maximum possible deviations for each target data item, here speed and quality. For the present example, the values for speed and quality are assumed to lie between 0 and 100, so that a maximum possible deviation of two offering parties is 100. Since two target data items each having a maximum deviation of 100 are considered, the scaling value is calculated as 100+100=200. The adjustment factor is calculated as one minus the sum of absolute differences divided by the scaling value: 1−40:200=1−0.2=0.8.

As has been previously shown, the correspondence indicator for the further exemplary offering party having a value of speed of 90 and a value of quality of 60 is 90, thereby leaving a difference of 10 from the maximum possible correspondence indicator 100. This difference is multiplied by the adjustment factor. In order to obtain an adjustment value: 0.8×10=8. This adjustment value is added to the correspondence indicator: 90+8=98. The result is that the correspondence indicator with feedback is higher than the correspondence indicator without feedback.

This may be explained as follows: While the seeking party had indicated that a value of speed of 80 and a value of quality of 80 are desired, the seeking party has also indicated that, still, an offering party having a value of speed of 60 and a value of quality of 70 may be interesting. Taking this into account in the calculations described herein shows that the further offering party may indeed be more interesting to the seeking party despite the difference of 20 in the value of quality.

In other embodiments, the selection of a seeking party by an offering party is taken into account for the further processing. This may improve the determination of the correspondence indicator, e.g. in view of the exemplary embodiment shown in FIG. 14. An offering party may then obtain a list of matching seeking parties taking into account a previously selected seeking party, i.e., a seeking party in which the offering party had an interest in.

If the information that a seeking party has selected a certain offering party is considered for the further processing, this will be understood as offering party reference data. If the information that an offering party has selected a certain seeking party is considered, this will be understood as seeking party reference data. Using at least one of this reference data may be used to establish a learning system.

In a further exemplary embodiment, statistical deviations in reference data may be taken into account by the computing system. Statistical analysis of the feedback information obtained from at least one of the offering party reference data and the seeking party reference data may be used as a weighting factor for the target data items and/or offering data items. This may help to understand that for particularly well suited seeking parties or offering parties one or more data items differ from the mean of all data items in a statistically relevant manner. These deviations are preferably considered in order to apply a correction value to the desired values entered by a seeking party.

With regard to the offering party reference data all values of the test result are summed for each data item [i], and the average value $P_m[i]$ for each target data item and the corresponding standard deviation are calculated. In addition, a global average $T_m[i]$ and the corresponding standard deviation is calculated for all offering party reference data and all data items. This global average may be the average of all averages of all data items.

Then, for each data item the difference between $T_m[i]$ and $P_m[i]$ is calculated as $D_m[i]=T_m[i]-P_m[i]$. If $D_m[i]$ is significant, i.e. if it is greater than the sum of both standard deviations, a weighting factor is calculated as $G_s[i]=1-(D_m[i]/D_{max})$, where $D_{max}$ is the maximum possible deviation of $T_m$ and $P_m$ for the particular interactive test that is chosen. In view of the examples explained above, the range had been chosen to range from 0 to 100, so that the maximum deviation is 100.

Since the difference $T_m[i]-P_m[i]$ can be positive or negative, the value for $G_s[i]$ can range between 0 and 2. The target data item entered by a seeking party for a certain subjective information is multiplied by $G_s[i]$, wherein the resulting value is limited to a range between 0 (minimum) to 100 (maximum).

In another exemplary embodiment the seeking party reference data is considered in a manner correspondingly to the offering party reference data as explained above. Here, all seeking party reference data is used to obtain an average value $P_m[i]$ for each target data item of all seeking parties. Further, as explained above, the standard deviation is calculated as well.

In an exemplary the seeking party is an employer seeking at least one employee, the offering party is a job seeker, and the interactive test is adapted to determine employment-related subjective information. In another exemplary the seeking party is an employer seeking an analysis of its employees, the offering party is an employee to be evaluated, and the interactive test is adapted to determine employment-related subjective information.

According to one exemplary embodiment, a company's human resource department may apply the presented teachings in order to find suitable individuals for filling a job vacancy outside and/or inside the company. According to another exemplary embodiment, a human resource department may apply the presented teachings in order to determine which individuals of the workforce are in a matching job position matching and/or which other job position may be a better match. According to yet another exemplary embodiment, the presented teachings may be applied as a part of a pre-hire assessment. According to still another exemplary embodiment, the presented teachings may be applied to obtain a best-job-fit, in particular without being influenced by personal bias.

The indefinite articles "a" and "an," as used herein in the specification and in the claims, unless clearly indicated to the contrary, should be understood to mean "at least one."

The exemplary systems and methods of this disclosure have been described in relation to a computing system, and in particular a client-server based computing environment. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

For example, the various computing devices could have multiple physical and/or logical screens/displays. Additionally, the various computing devices could be used with one or more input devices such as a stylus, mouse, or the like. Moreover, the various computing devices could be populated with a processor, memory, communications means and the like, that would allow for stand-alone operation. Even further, the various computing devices could be associated or connected to other types of communications devices such as a smartphone or browser appliance.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a computing or tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a server, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein.

In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Where the context permits, words using the singular or plural number may also include the plural or singular number, respectively. The words "or" in reference to a list of two or more items, is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than a restrictive sense. Further, the operations and steps described with reference to the preceding FIGURES illustrate only some of the possible scenarios that may be executed by, or within, the various apparatuses, processors, devices, and/or systems, described herein. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computer-implemented method to create an offering parties group, the method comprising:
   receiving, via a seeking party user interface on a computing device, a target data set for a seeking party, including:

a target reference information item that identifies said target data set for an employer or a landlord, target data of a first type of data which is added to said target data set, said target data comprising a target data item, target data of a second type of data which is added to said target data set, said further target data comprising a further target data item, and storing, in non-transitory storage, said target data set, determining at least one interactive test;

automatically administering, to each offering party of a plurality of offering parties, the at least one interactive test, the at least one interactive test obtaining subjective information which is not objectively available, the at least one interactive test requiring interaction of each offering party, including intellectual interaction;

automatically evaluating results of said at least one interactive test;

obtaining and storing the results of the at least one interactive test;

receiving, via an offering party user interface on a computing device, for each offering party of the plurality of offering parties, an offering data set, including:

an offering reference information item for identifying said offering data set for a job seeker, an employee or a lessee, offering data of said first type of data which is added to said second data set, said offering data comprising an offering data item, results of the at least one interactive test which required working on mental tasks by each offering party, automatically evaluating the results of said interactive test for deriving further offering data of said second type of data, said further offering data comprising a further offering data item, adding said further offering data to said second data set, and storing, in storage, said offering data set, for each offering party of said plurality of offering parties, determining, using at least one processor and memory, a correspondence indicator indicating a degree of correspondence between the target data set and each of the offering data sets of each offering party, for each offering party of said plurality of offering parties, storing said correspondence indicator of said offering party and an identifying indicator for said offering party linked to each other, wherein said first type of data includes objective personal information, wherein said second type of data includes subjective personal information, wherein said step of determining a correspondence indicator includes determining an average of differences between each target data item and a corresponding offering data item and between each further target data item and a corresponding further offering data item, and wherein a value of a difference is set to zero, if said target data item is less than said corresponding offering data item; and outputting a list of selectable entries enabling at least one of establishing contact with at least one of said plurality of offering parties, obtaining more details about at least one of said plurality of offering parties and adding at least one of said plurality of offering parties to a preferred list, wherein said step of determining a correspondence indicator includes determining a first correspondence indicator based on indicating a degree of correspondence between said target data and said offering data, determining a second correspondence indicator based on indicating a degree of correspondence between said further target data and said further offering data and weighting said first correspondence indicator relative to said second correspondence indicator, wherein a first weight is associated with the first correspondence indicator, a second weight is associated with the second correspondence indicator, and wherein dividing the second weight by the first weight results in a value greater than or equal to 1 and less than or equal to 9, wherein said offering parties group is presented to said seeking party as a list of identifying indicators of said plurality of offering parties, wherein said list is sorted in a descending order based on said correspondence indicators of said plurality of offering parties, further comprising determining, using the processor and memory, a deviation between said offering party and said selected offering party and adjusting said correspondence indicator based on said deviation, wherein said interactive test is at least one of language-independent and culture-independent, wherein said interactive test is performed using one or more of an internet browser and application running on a computing device, wherein the seeking party is an employer seeking at least one employee, the offering party is a job seeker, and the interactive test is adapted to determine employment-related subjective information, and wherein said first type of data consists only of objective personal information, and wherein said second type of data consists only of subjective personal information.

2. The method of claim 1, wherein said step of determining said deviation includes determining an absolute difference between said target data item of said offering party and a corresponding target data item of said selected offering party and dividing said absolute difference by a difference of a maximum value of said target data item and a minimum value of said target data item.

3. The method of claim 1, wherein said target data of said offering party and said target data of said selected offering party comprise a plurality of target data items, and wherein said step of determining said deviation includes:

determining absolute differences between each target data item of said offering party and a corresponding target data item of said selected offering party, calculating a first sum of all said absolute differences, calculating a second sum of: a maximum value of each target data item and a minimum value of each target data item, and dividing said first sum by said second sum.

4. The method of claim 1, further comprising determining a first difference between an indicator of a maximum correspondence and said correspondence indicator, determining a second difference between a maximum deviation and said deviation, determining a modification value by multiplying, using the processor and memory, said first difference by said second difference, and adding said modification value to said correspondence indicator.

5. The method of claim 1, wherein the steps of storing said target data set, storing said offering data set and storing said correspondence indicator store information on a remote server accessible via the internet.

6. A method for custom-engineered sourcing, the method comprising:

receiving, via a seeking party user interface on a computing device, a target data set for a seeking party, including:
  a target reference information item that identifies said target data set for an employer or a landlord,
  target data of a first type of data which is added to said target data set, said target data comprising a target data item,
  target data of a second type of data which is added to said target data set, said further target data comprising a further target data item, and
storing, in non-transitory storage, said target data set,
determining at least one interactive test;
automatically administering, to each offering party of a plurality of offering parties, the at least one interactive test, the at least one interactive test obtaining subjective information which is not objectively available, the at least one interactive test requiring interaction of each offering party, including intellectual interaction;
automatically evaluating results of said at least one interactive test;
obtaining and storing the results of the at least one interactive test;
receiving, via an offering party user interface on a computing device, for each offering party of the plurality of offering parties, an offering data set, including:
  an offering reference information item for identifying said offering data set for a job seeker, an employee or a lessee,
  offering data of said first type of data which is added to said second data set, said offering data comprising an offering data item,
  results of the at least one interactive test which required working on mental tasks by each offering party,
  automatically evaluating the results of said interactive test for deriving further offering data of said second type of data, said further offering data comprising a further offering data item,
adding said further offering data to said second data set, and
storing, in storage, said offering data set,
for each offering party of said plurality of offering parties, determining, using at least one processor and memory, a correspondence indicator indicating a degree of correspondence between the target data set and each of the offering data sets of each offering party,
for each offering party of said plurality of offering parties, storing said correspondence indicator of said offering party and an identifying indicator for said offering party linked to each other,
wherein said first type of data includes objective personal information,
wherein said second type of data includes subjective personal information,
providing an ability to select an offering party from said offering parties group based on at least portions of said offering data of said selected offering party when determining said correspondence indicator, and
determining, using the processor and memory, a deviation between said offering party and said selected offering party and adjusting said correspondence indicator based on said deviation, and
wherein said step of determining said deviation includes determining an absolute difference between said target data item of said offering party and a corresponding target data item of said selected offering party and dividing said absolute difference by a difference of a maximum value of said target data item and a minimum value of said target data item; and
outputting a list of selectable entries enabling at least one of establishing contact with at least one of said plurality of offering parties, obtaining more details about at least one of said plurality of offering parties and adding at least one of said plurality of offering parties to a preferred list,
wherein said offering parties group is presented to said seeking party as a list of identifying indicators of said plurality of offering parties, wherein said list is sorted in a descending order based on said correspondence indicators of said plurality of offering parties,
wherein said interactive test is at least one of language-independent and culture-independent,
wherein said interactive test is performed using one or more of an internet browser and application running on a computing device, and
wherein the seeking party is an employer seeking at least one employee, the offering party is a job seeker, and the interactive test is adapted to determine employment-related subjective information.

7. A method for custom-engineered sourcing, the method comprising:
receiving, via a seeking party user interface on a computing device, a target data set for a seeking party, including:
  a target reference information item that identifies said target data set for an employer or a landlord,
  target data of a first type of data which is added to said target data set, said target data comprising a target data item,
  target data of a second type of data which is added to said target data set, said further target data comprising a further target data item, and
storing, in non-transitory storage, said target data set,
determining at least one interactive test;
automatically administering, to each offering party of a plurality of offering parties, the at least one interactive test, the at least one interactive test obtaining subjective information which is not objectively available, the at least one interactive test requiring interaction of each offering party, including intellectual interaction;
automatically evaluating results of said at least one interactive test;
obtaining and storing the results of the at least one interactive test;
receiving, via an offering party user interface on a computing device, for each offering party of the plurality of offering parties, an offering data set, including:
  an offering reference information item for identifying said offering data set for a job seeker, an employee or a lessee,
  offering data of said first type of data which is added to said second data set, said offering data comprising an offering data item,
  results of the at least one interactive test which required working on mental tasks by each offering party,
  automatically evaluating the results of said interactive test for deriving further offering data of said second type of data, said further offering data comprising a further offering data item,
adding said further offering data to said second data set, and
storing, in storage, said offering data set,
for each offering party of said plurality of offering parties, determining, using at least one processor and memory, a correspondence indicator indicating a degree of correspondence between the target data set and each of the offering data sets of each offering party, for each offering party of said plurality of offering parties, storing said correspondence indicator of said offering party and an identifying indicator for said offering party linked to each other, wherein said first type of data includes objective personal information, wherein said second type of data includes subjective personal information, providing an ability to select an offering party from said offering parties group based on at least portions of said offering data of said selected offering party when determining said correspondence indicator, and determining, using the processor and memory, a deviation between said offering party and said selected offering party and adjusting said correspondence indicator based on said deviation, determining a first difference between an indicator of a maximum correspondence and said correspondence indicator, determining a second difference between a maximum deviation and said deviation, determining a modification value by multiplying, using the processor and memory, said first difference by said second difference, and adding said modification value to said correspondence indicator, and outputting a list of selectable entries enabling at least one of establishing contact with at least one of said plurality of offering parties, obtaining more details about at least one of said plurality of offering parties and adding at least one of said plurality of offering parties to a preferred list, wherein said offering parties group is presented to said seeking party as a list of identifying indicators of said plurality of offering parties, wherein said list is sorted in a descending order based on said correspondence indicators of said plurality of offering parties, wherein said interactive test is at least one of language-independent and culture-independent, wherein said interactive test is performed using one or more of an internet browser and application running on a computing device, and wherein the seeking party is an employer seeking at least one employee, the offering part is a job seeker, and the interactive test is adapted to determine employment-related subjection information.

8. A non-transitory computer-readable information storage media having stored thereon instructions, that when executed by a computer, cause a method to create an offering parties group to be performed, comprising:

receiving, using a seeking party user interface on a computing device, a target data set for a seeking party, including:

a target reference information item that identifies said target data set for an employer or a landlord, target data of a first type of data which is added to said target data set, said target data comprising a target data item, and target data of a second type of data which is added to said target data set, said further target data comprising a further target data item, and storing, in non-transitory storage, said target data set;

determining at least one interactive test;

automatically administering, to each offering party of a plurality of offering parties, the at least one interactive test, the at least one interactive test obtaining subjective information which is not objectively available, the at least one interactive test requiring interaction of each offering party, including intellectual interaction;

automatically evaluating results of said at least one interactive test;

obtaining and storing the results of the at least one interactive test;

receiving, using an offering party user interface on a computing device, for each offering party of a plurality of offering parties, an offering data set, including:

an offering reference information item for identifying said offering data set for a job seeker, an employee or a lessee, offering data of said first type of data which is added to said second data set, said offering data comprising an offering data item, and results of the at least one interactive test that required working on mental tasks by each offering party, automatically evaluating the results of said interactive test for deriving further offering data of said second type of data, said further offering data comprising a further offering data item, adding said further offering data to said second data set, and storing, in storage, said offering data set, for each offering party of said plurality of offering parties, determining, using at least one processor and memory, a correspondence indicator indicating a degree of correspondence between the target data set and each of the offering data sets of each offering party, for each offering party of said plurality of offering parties, storing said correspondence indicator of said offering party and an identifying indicator for said offering party linked to each other, and wherein said first type of data includes objective personal information, wherein said second type of data includes subjective personal information, wherein said step of determining a correspondence indicator includes determining an average of differences between each target data item and a corresponding offering data item and between each further target data item and a corresponding further offering data item, and wherein a value of a difference is set to zero, if said target data item is less than said corresponding offering data item, outputting a list of selectable entries enabling at least one of establishing contact with at least one of said plurality of offering parties, obtaining more details about at least one of said plurality of offering parties and adding at least one of said plurality of offering parties to a preferred list, wherein said offering parties group is presented to said seeking part as a list of identifying indicators of said plurality of offering parties, wherein said list is sorted in a descending order based on said correspondence indicators of said plurality of offering parties, wherein said interactive test is at least one of language-independent and culture-independent, wherein said interactive test is performed using one or more of an internet browser and application running on a computing device, and wherein the seeking party is an employer seeking at least one employee, the offering party is a job seeker, and the interactive test is adapted to determine employment-related subjective information.

\* \* \* \* \*